United States Patent [19]

Reid

[11] Patent Number: 5,064,075
[45] Date of Patent: Nov. 12, 1991

[54] SEPARATION OF NON-MAGNETIC ELECTRICALLY CONDUCTIVE ITEMS BY ELECTROMAGNETIC EDDY CURRENT GENERATION

[76] Inventor: Peter T. Reid, North Lodge, Bayford, Hertfordshire, England

[21] Appl. No.: 679,176

[22] Filed: Mar. 26, 1991

Related U.S. Application Data

[63] Continuation of Ser. No. 417,975, Nov. 6, 1989, abandoned.

[30] Foreign Application Priority Data

Oct. 6, 1988 [GB] United Kingdom ............... 8823495

[51] Int. Cl.$^5$ .......................... B07C 5/344; B03C 1/23
[52] U.S. Cl. ........................................ 209/636; 209/2; 209/212; 209/227
[58] Field of Search ................. 209/2, 509, 606, 636, 209/695, 212, 225–228, 231

[56] References Cited

U.S. PATENT DOCUMENTS

| | | | |
|---|---|---|---|
| 4,137,156 | 1/1979 | Morey et al. | 209/227 X |
| 4,229,288 | 10/1980 | Akamm | 209/227 X |
| 4,459,206 | 7/1984 | Laithwaite | 209/3 |
| 4,834,870 | 5/1989 | Osterberg et al. | 209/212 X |

FOREIGN PATENT DOCUMENTS

| | | | |
|---|---|---|---|
| 52-44958 | 4/1977 | Japan | 209/636 |
| 1547837 | 6/1976 | United Kingdom . | |

Primary Examiner—Michael S. Huppert
Assistant Examiner—Edward M. Wacyra
Attorney, Agent, or Firm—Kinney & Lange

[57] ABSTRACT

The invention provides a method of separating predetermined non-magnetic electrically conductive items from a flow of non-magnetic electrically conductive materials containing such items and other non-magnetic electrically conductive materials comprising the steps of passing the flow of materials adjacent to electromagnetic field generating apparatus; controlling the flux field generated by the apparatus such as to create electrical currents within the predetermined electrically conductive items which react with the generated electromagnetic flux field causing the creation of a directional force upon the predetermined items such as to move only the predetermined electrically conductive items out of and away from the flow of material.

11 Claims, 4 Drawing Sheets

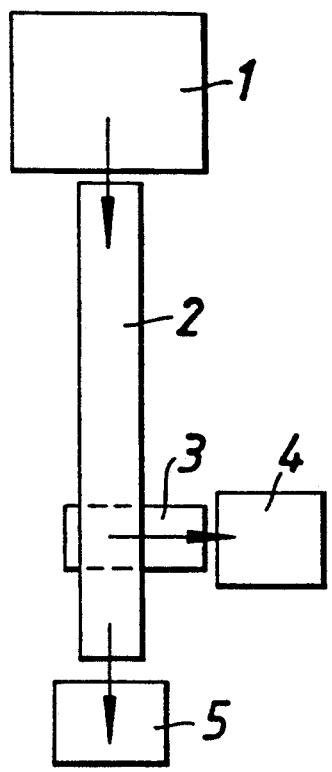
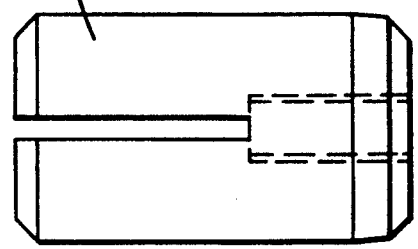
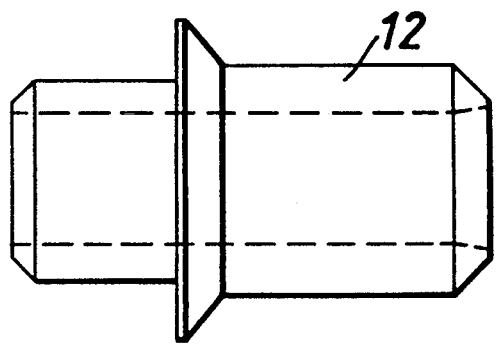
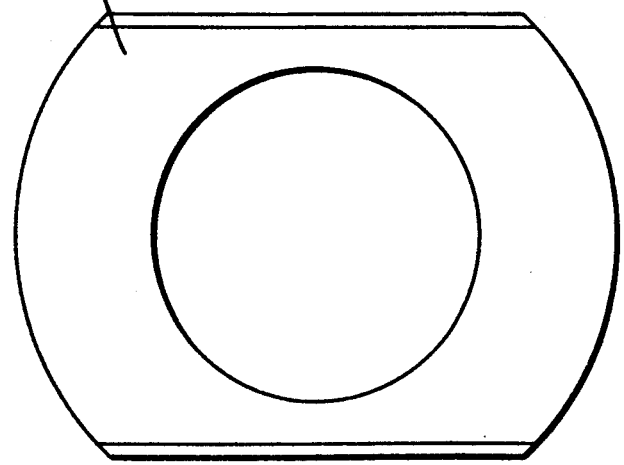

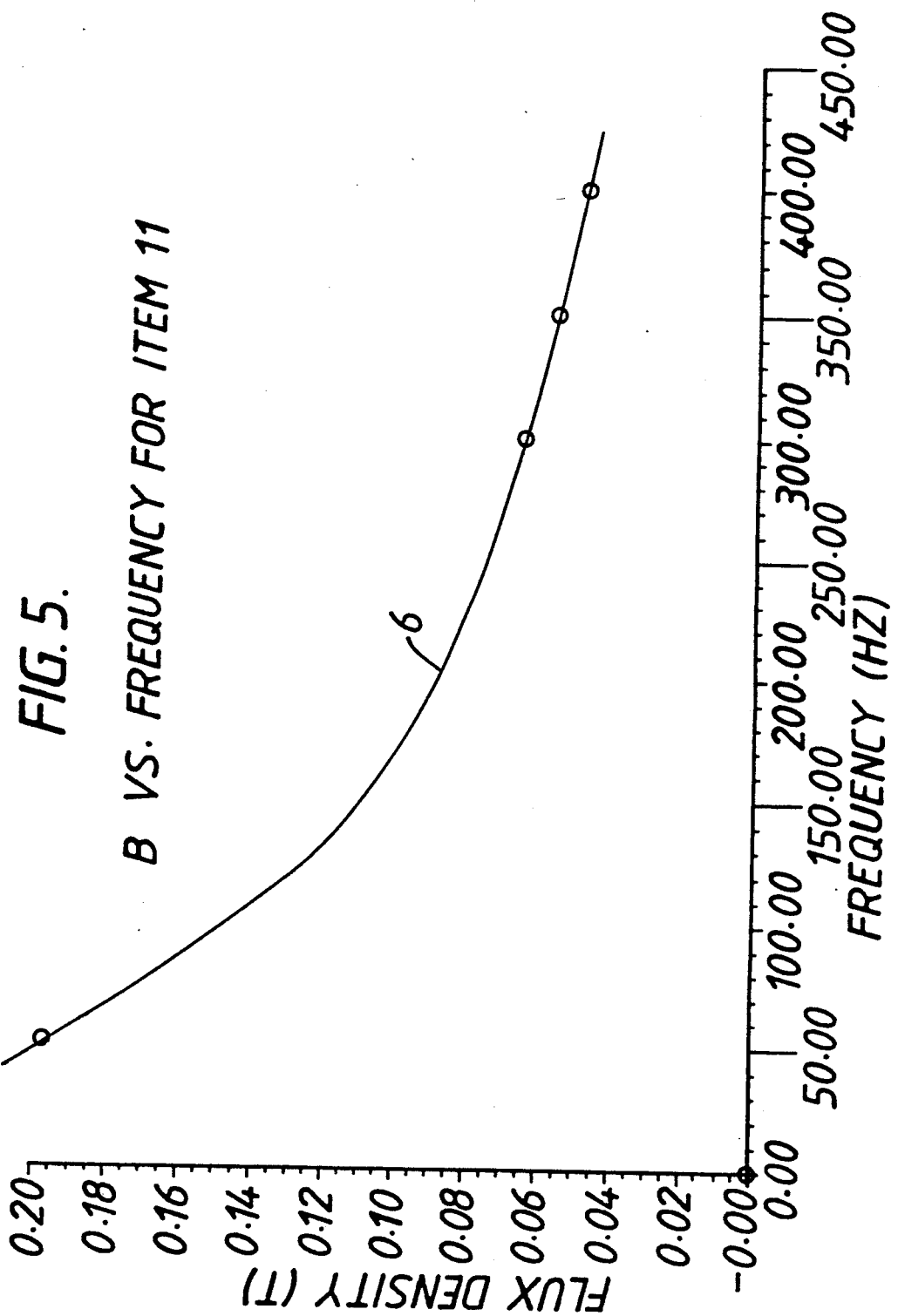

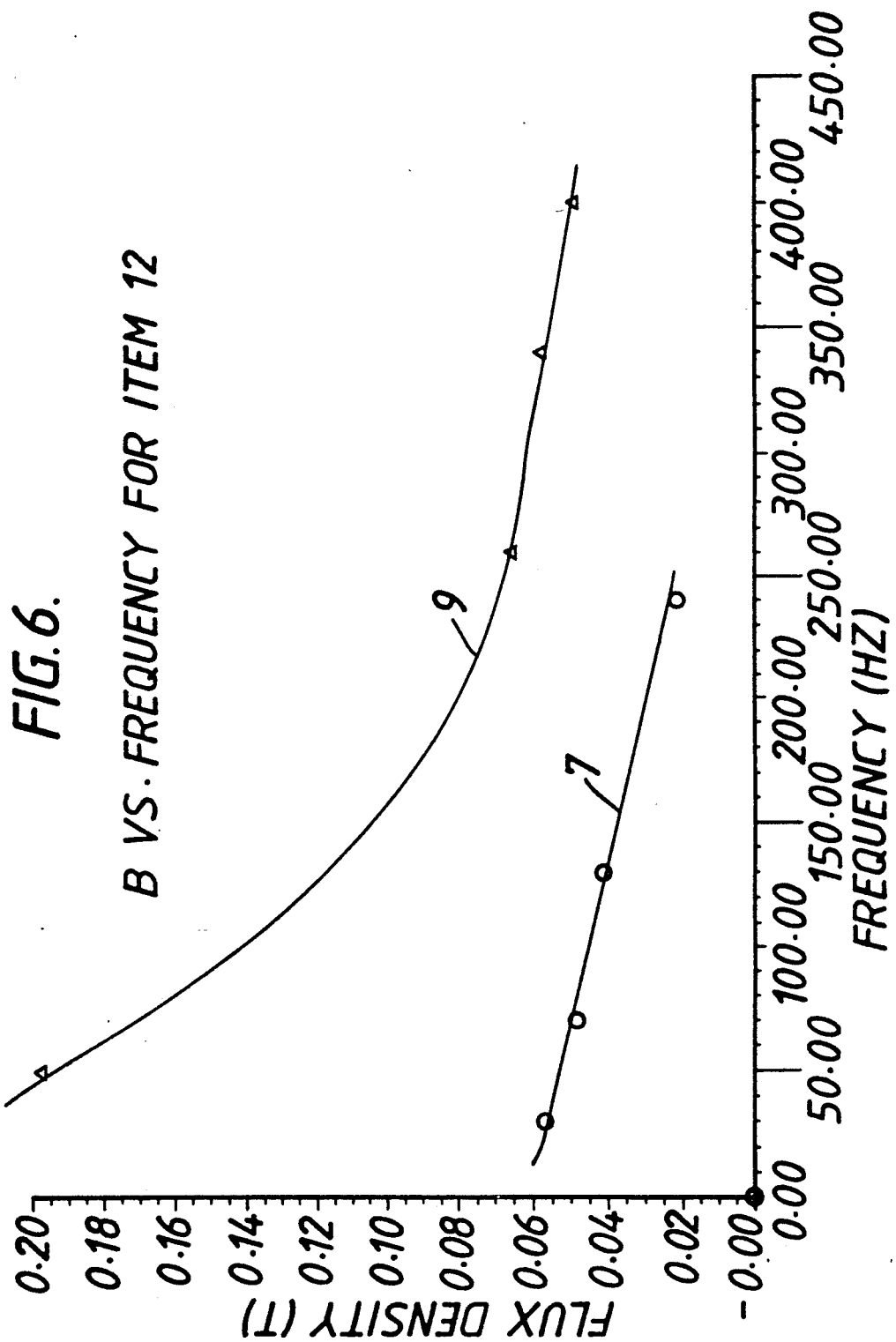

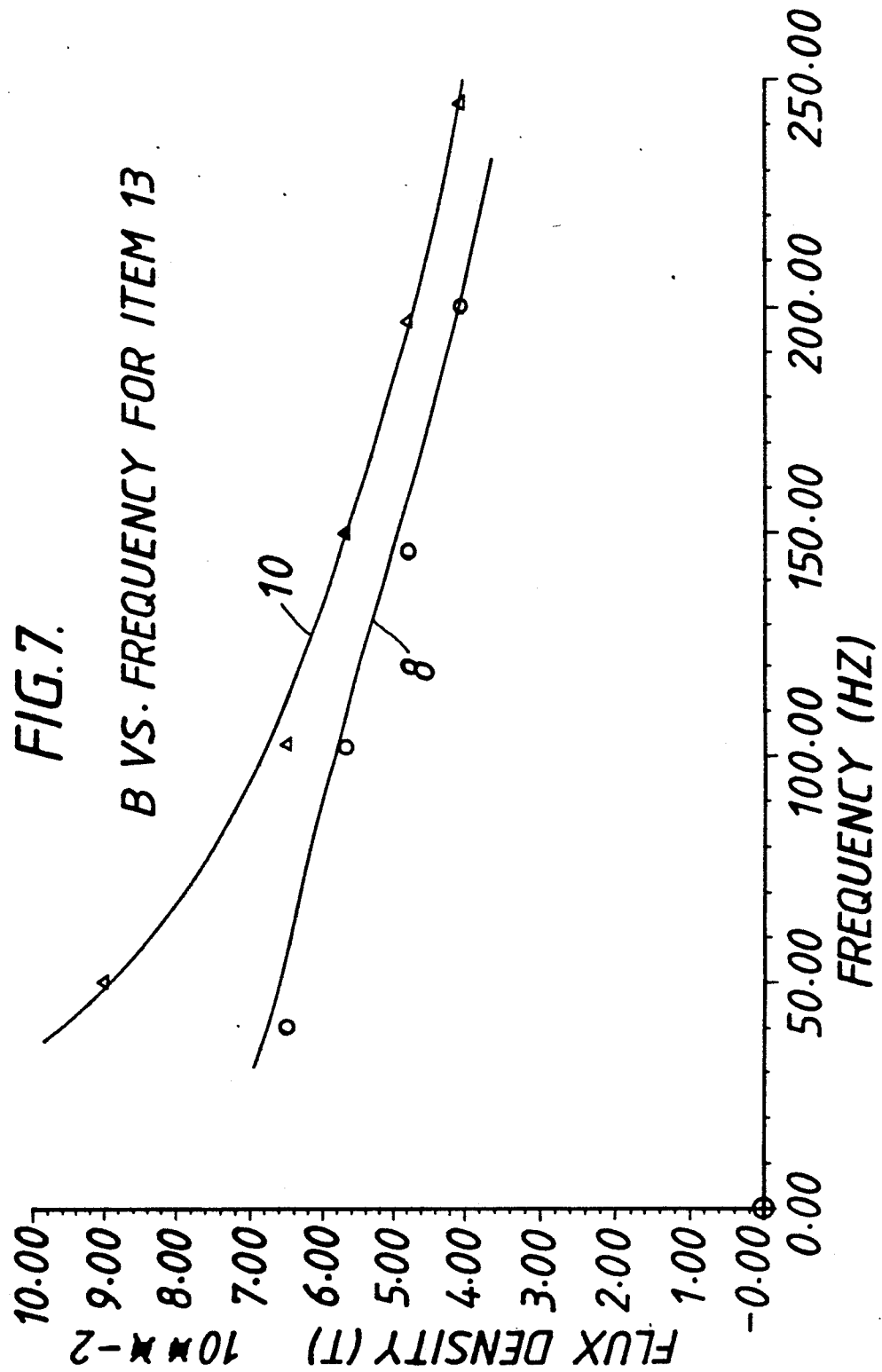

SEPARATION OF NON-MAGNETIC ELECTRICALLY CONDUCTIVE ITEMS BY ELECTROMAGNETIC EDDY CURRENT GENERATION

This is a continuation of application Ser. No. 07/417,975 filed on Oct. 6, 1989, abandoned as of the date of this application.

This invention relates to the separation of materials.

A common industrial problem associated with the production of many items is that of the need for separation of the particular items produced from associated waste material involved in their production. Similarly a long standing problem is the general one of the separation and sorting between various scrap and rubbish materials. Whilst the separation out of magnetic portions of such materials by means of their magnetic properties has proved possible, the separation and sorting of non-magnetic materials still presents considerable problems.

This invention is particularly concerned with material separation methods for non-magnetic materials, and is especially concerned with the separation of a collection of items having significant electrical conductivity, either by virtue of conductive materials of which they are formed or by virtue of conductive coatings or inserts.

It is an object of the present invention to provide a method of material separation for electrically conductive items of simple effective and efficient operation which can overcome or at least subtantially reduce the above mentioned problems.

In accordance with the present invention there is provided a method of separating predetermined non-magnetic electrically conductive items from a flow of non-magnetic electrically conductive materials containing such items comprising the steps of passing the flow of the materials adjacent to electromagnetic field generating apparatus; controlling the flux field generated by the apparatus such as to create electrical currents within the predetermined electrically conducting items which react with the generated electromagnetic flux field causing the creation of a directional force upon the predetermined items such as to move only the predetermined electrically conducting items out of and away from the flow of materials.

The electromagnetic field generating apparatus may comprise an electromagnetic induction apparatus creating a fixed flux field such as, for example, a design modification of the structure of an induction heater. Alternatively, and in a preferred embodiment, the electromagnetic field generating apparatus is arranged to produce a travelling flux field transverse to the direction of travel of the materials adjacent thereto. Such a travelling flux field has been found to be of great effectiveness in the operation of the invention. Thus, most conveniently, a linear induction motor stator may be used as the electromagnetic field generating apparatus.

With a linear motor, it is to be noted that the speed of flux field movement (which I believe can be significant in some embodiments of my invention because induced current depends on the flux density and the speed of field travel) is directly related to the supply frequency and the pole pitch.

In the case of a linear motor it has been found that after making a suitable choice of pole pitch in the design of the motor, control of the flux field to provide the required movement of the predetermined items can be by determination of the necessary input power and/or the power supply frequency.

It has been found in practice that for the removal of relatively small predetermined items away from the flow of materials (for example items having dimensions varying from a score or so of cm's down to a mm or less) the method of the invention is particularly effective when used with a linear motor stator having a small pole pitch (for example less than 6 cm) and a high flux density (for example greater than 0.3 Tesla).

The method may be used with a control system for the linear induction motor incorporating variable terminal voltage as the single control variable, determining flux density. Such supply-frequency system may be either single phase and three phase.

The motor may be provided with a variable frequency control system whereby in the method both frequency and flux density can be controlled, and this may be by means of a three-phase invertor.

A variable frequency supply, although adding to the cost of capital equipment in use of the method, (which can be in the form of a three phase invertor) enables both frequency and flux density produced by the induction motor to be controlled. A single phase supply can be made to operate on a three phase system by means of the already known steinmetsz connection, for example.

The invention is at least partly based upon the realization that by appropriate design of electromagnetic field generating apparatus, and by appropriate choice of power supply thereto it is surprisingly possible, in a manner not appreciated before, to separate electrically conductive items predetermined by virtue of their shape or size from a composite flow of materials including those predetermined items together with other electrically conductive items. In general terms, the separating effect provided by the invention depends on the specific electrical characteristics of the items to be removed and their friction on the conveyor, compared to those of other items in the flow. Useable related characteristics are size and shape, as just mentioned, and others include the material of the item, its physical nature (e.g. the inclusion of laminations) and conductivity. In the latter context, it is interesting to note that swarf with its typical cracked surface, is a poor conductor. These general requirements render the invention particularly useful in separating items of different shape or size formed of the same material, and can be used with the output from many metal forming or semi-forming operations, such as diecasting, stamping, drilling and cutting. The design of the electromagnetic field generating apparatus, and its power supply requirements for any particular item can, I have found, be determined by trial and error without significant difficulty, and indeed can readily be done if arrangements are provided for giving variability of power supply to a selected generating apparatus.

A typical problem to which the present invention is applicable is that of separating cast or moulded electrically conductive items, after release from the appropriate dies or moulds and from those solidified portions of material with which the items are formed, from the feed and/or overflow parts. Thus, purely by way of example, a problem arises in the die casting of conductive metal alloy components, which, after ejection from the die are broken from the metal solidified in the sprue, feeder and overflow portions, and are then fed away from the casting machine for separation of the component itself. In such circumstances separation tends to be a somewhat difficult and expensive task because the sharp angularity of the sprue formed material in particular, and the generally awkward dimensions of the various products render vibratory screen separation techniques difficult and expensive to utilise so that separation of the items from their associated scrap metal portions is of necessity commonly carried out by manual operation. This is itself an expensive and inefficient method of sorting, particularly since it necessitates a considerable cooling of the items and the scrap metal. This is particularly disadvantageous if it is intended, as frequently is the case, that scrap metal be immediately remelted for reuse, because of the consequent expense of additional reheating.

Another typical example of material separation in an area where the invention has good application is the separation of items produced on a lathe or machining center, particularly small items, from their accompanying swarf. Yet again normal separation techniques in such a situation can be time consuming and costly.

Whilst a linear induction motor has particular advantages in that it can be arranged to move a conductive item in a particular direction over a considerable distance, a simple inductive device similar to that used for induction heating can, with the appropriate configuration and power arrangements, provide an adequate "throw" force with respect to the particular items concerned easily to remove specific items from a mixed collection of materials.

In one convenient form of the invention, the material from which items are to be separated can be moved by means of a travelling and/or vibrating conveyor across the upper face of a suitable induction apparatus. Vibration of the conveyor, in some instances, is particularly beneficial in assisting the removal of the predetermined items. The conveyor may be inclined on its upper face with its windings and power configuration arranged such that materials not experiencing the appropriate induced forces, slide across the inclined upper face of the device into an appropriate receptable, whilst the specified items are "thrown" in a different direction, for example, up the inclination and into a second appropriate receptacle.

As has previously been mentioned such an arrangement has been found to be eminently suitable for separating small metallic items, such as brass or light metal alloy, from swarf or other appropriate flashing or scrap material associated with it. Again, by appropriate choice of power in a sequence of induction apparatus disposed under a continuing conveyor, conductive scrap can be sequentially separated into different sizes and/or shapes and/or materials.

In order that the invention may be more readily understood, one embodiment thereof will now be described by way of example with reference to the accompanying drawings in which FIG. 1 illustrates schematically and diagramatically the application of the invention to the separation of die cast items from associated scrap metal;

FIGS. 2, 3 and 4 illustrate predetermined test items of various kinds; and

FIGS. 5, 6 and 7 show test results of the items of FIGS. 2, 3 and 4 respectively.

In FIG. 1 a die cast machine 1 produces fashion accessories such as buckles for belts from light alloy metal. The die casting operation is of a standard nature, and on opening the dies after casting, the solid metal comprising the components for use as the belt buckles, and scrap metal which comprises the metal solidified in the sprue and the feeders to the component, and the overflows therefrom, together with flashing from the joints between the die pieces are all joined. The belt components are automatically physically broken from the scrap metal, and all the material is ejected, still hot, onto a vibratory conveyor 2. This carries the combined metal components and scrap metal forward to a small linear induction motor 3, which can be in the order of 25 cm × 50 cm in plan view, although sizes can vary considerably in practice with dimensions between, for example, 15 cm and 60 cm. With appropriate configuration of windings producing an appropriate inductive effect, electric currents are set up within the components such as to provide an appropriate force upon the buckles to remove them from the linear motor to one side into an appropriate collecting receptacle 4, whilst not having the same effect, because of different dimensions and masses, on the scrap metal parts of the remaining material on the motor. The linear motor itself may be set with its upper face at an inclined angle to the horizontal so that the selected components have to rise up the incline thereby increasing the selectivity. Remnant scrap metal left behind on the conveyor after the belt components have been lifted off will slide into a container 5 at the end of the conveyor, or alternatively may be fed directly back to a melting furnace associated with the die cast machine. It is to be stressed that by testing an appropriate configuration and power setting for the motor it can be provided such as to move the components, but not to move the metal solidified from the sprue or feeders or overflows of the die cast, these in practise invariably being of different size and/or shape and dimension to the belt components.

Discussion of design and test work that has been carried out will assist appreciation and understanding of the present invention.

Test work was carried out to ascertain the optimum characteristics of a number of particular linear induction motor stators to move items from a disposition immediately above the operating face of a motor. Examples of the specific items concerned are shown in FIGS. 2, 3 and 4, these comprising a slotted bar 11, a hollow flanged stud 12, and a washer 13.

FIGS. 5, 6 and 7 illustrate the effects of variation in flux density and frequency to move the relevant items upon the motor.

Essentially the items concerned in this group of experiments were those appropriate to the removal of small items travelling on a conveyor after removal from a lathe so that, for example, machined aluminium peices can be separated from various swarfes of the same aluminium material similarly ejected from the lathe.

In the tests, initial investigations concerning the design of motor were carried out, and in particular the effect of the pole pitch (the distance between adjacent north and south poles measured along the stator surface) was determined. Of three machines having pole pitches of 5.6, 11.2 and 17 cm, it was found that items placed on top of a piece of hardboard (approximately 2 mm thick) placed on top of the stator to simulate a conveyer showed that lower input currents and frequecies in the power supply for movement of all items occured with the 5.6 mm pole pitch motor. Manifestly therefore for components of the materials shape and size being tested, a small pole pitch machine was eminently desirable. The further investigations discussed hereafter were carried out on the machine of smallest pole pitch.

Supply of power to the motor was by way of a three phase inverter providing a variable frequency supply such that both frequency and flux density (by input current) could be controlled.

With such an arrangement tests were carried out on the three aluminium items comprising a slotted bar 11 approximately 18 mm long and 10 mm in diameter, a hollow flanged stud 12 approximately 21.5 mm long and 11 mm in diamter, and a washer 13 approximately 27 mm by 19.50 mm in width and 2.40 mm thick. The results of the tests are shown in the phase plane diagrams of FIGS. 5, 6 and 7 respectively and show a lower curve 6, 7, 8 indicating the onset of random motion. Below this curve no form of motion of any kind of the relevant articles was observed. The region above an upper curve 9, 10 defines the frequency/flux density combinations at which useful motion occured, that is to say the components would be propelled along the motor in the direction of travel of the flux field and expelled at the end, independently of initial position or orientation.

The region between the upper and lower curves indicated a frequency/flux combination in which continuous motion was seen to occur but for which the motion was not satisfactory. In this region the component might simply spin, flip end over end or move down the motor depending on initial orientation and whether or not the simulted conveyor was agitated.

FIG. 5 is particularly interesting in that no upper curve is shown, and with this particular component (item 11), with no movement of the simulated conveyor, no useful motion of the component occured. With this compoment therefore, without movement or vibration or agitation of the conveyor is necessary with the particular motor used in the test to produce useful movement of the item.

It is to be understood that the results in the phase plane diagrams of FIGS. 5, 6 and 7 clearly illustrate the inventive method of mine by which it is possible by appropriate field creating electromagnetic means to separate between different sizes and shapes of electrically conductive materials, even of the same metal. However, the particular frequencies and flux densities shown can only be regarded as indicative of the possibilities of this invention, since considerable improvement, for use with the particular items concerned, in the design of the motor can easily be invisaged.

It can be mentioned as of interest that similar tests (not illustrated) were carried out with a small aluminium bar approximately 2 mm long and 1 mm in diameter. A lower curve was produced but not an upper curve, and useful motion could be induced by vibration of the simulated conveyor.

It is to be understood that the invention of the present application is not applicable to the separation of magnetic materials, since these would have a different reaction with respect to electromagnetic induction apparatus by virtue of normal magnetic effects. Various separation systems with respect to magnetic materials from non-magnetic materials have been developed over many years. Indeed the success in dealing with the separation of magnetic materials from non-magnetic materials serves to stress even more highly the problems of achieving satisfactory separation where no magnetic materials are involved, of the kind to which the present invention is so suitably applicable.

By means of the invention as described and illustrated, we have provided a most convenient and effective method for separating specific metal or other conductive items from a miscellaneous assortment of items of the same or other conductive materials.

It is to be understood that the foregoing is merely exemplary of separation methods in accordance with the invention and that modifications can readily be made thereto without departing from the true scope of the invention.

I claim:

1. A method of separating specific predetermined non-magnetic electrically conductive items having a predetermined combination of configuration, dimensions, mass and composition from a flow of material containing such items and other non-magnetic electrically conductive material having the same composition but which do not have the predetermined combination; comprising the steps of passing the flow of material adjacent to an electromagnetic induction motor; and controlling the flux field generated by the motor by adjusting the power of the electrical supply to the motor and by adjusting the frequency of the electrical supply to the motor whereby to create electrical currents within the specific predetermined electrically conductive items which react with the generated electromagnetic flux field causing the creation of a directional force upon the specific predetermined items such as to move only the specific predetermined electrically conductive items out of and away from the flow of material while allowing the other material to continue to travel in the flow of material.

2. The method of claim 1 and further comprising the step of vibrating the flow of material while passing adjacent the electromagnetic induction motor.

3. The method of claim 2 wherein the step of passing the flow of material includes the step of passing the flow of material by means of a conveyor subject to vibration as the flow of material passes adjacent the electromagnetic induction motor.

4. The method of claim 1 wherein the step of adjusting the power of the electrical supply to the motor includes the step of adjusting the current of the electrical supply.

5. A method of separating specific predetermined non-magnetic electrically conductive items having a predetermined combination of configuration, dimensions, mass and composition from a flow of non-magnetic electrically conductive material containing such items as well as other materials of the same composition which do not have the predetermined combination, comprising the steps of passing the flow of material adjacent to an electromagnetic field generating linear induction motor; and controlling the flux field generated by the motor by adjusting the power of the electrical supply to the motor and by adjusting the frequency of the electrical supply to the motor whereby to create electrical currents within the specific predetermined electrically conductive items which react with the generated electromagnetic flux field causing the creation of a directional force upon the specific predetermined items such as to move only the predetermined electrically conductive items out of and away from the flow of material while allowing the other materials to continue to travel in the flow of material.

6. The method of claim 5 and further comprising the step of operating the linear induction motor with a three phase power supply.

7. The method of claim 6 and further comprising the step of generating the three phase power supply with an alternating current supply coupled to a single phase invertor.

8. The method of claim 5 wherein the step of controlling the flux field of the linear induction motor includes the step of varying the flux density to achieve optimum performance with respect to the particular predetermined items for removal.

9. The method of claim 5 and further comprising the step of vibrating the flow of material while passing adjacent the electromagnetic field generating linear induction motor.

10. The method of claim 9 wherein the step of passing the flow of material includes the step of passing the flow of material by means of a conveyor subject to vibration as the flow of material travels adjacent the electromagnetic field generating linear induction motor.

11. A method for separating specific predetermined non-magnetic electrically conductive items having a predetermined combination of configuration, dimensions, mass and composition from a flow of material containing such items as well as other materials of the same composition which do not have the predetermined combination, comprising:

passing the flow of material adjacent an electromagnetic induction motor; and adjusting the power and the frequency of the electrical supply to the motor to control the flux field generated by the motor and to create electrical currents within the specific predetermined electrically conductive items which react with the generated electromagnetic flux field causing the creation of a directional force upon the specific predetermined items such as to move only the specific predetermined electrically conductive items out of and away from the flow of material while allowing the other materials to continue to travel in the flow of material.

* * * * *